Jan. 29, 1952   H. E. WHITE   2,584,072
BACKUP DEVICE FOR WELDING, BRAZING, OR SOLDERING OPERATION
Filed Nov. 29, 1947

*INVENTOR.*
HERBERT E. WHITE
BY
*Eber J. Hyde*
ATTORNEY

Patented Jan. 29, 1952

2,584,072

UNITED STATES PATENT OFFICE 2,584,072

BACKUP DEVICE FOR WELDING, BRAZING, OR SOLDERING OPERATION

Herbert E. White, Cleveland Heights, Ohio

Application November 29, 1947, Serial No. 788,929

5 Claims. (Cl. 113—111)

This invention pertains to a back-up device for use in a welding, brazing or soldering operation.

It is often desirable to close a hole in a body of metal by filling it up with solder or with metal melted by welding equipment. Either of these procedures is particularly difficult if the body of metal is thin.

It is also difficult to perform welding operations on very thin sheets of metal as the welding process, unless it is performed by a highly skilled person, is apt to melt through the thin body of metal. Thus, the welding of seams and the filling of holes is very difficult in thin material.

It is an object of this invention to provide a device to enable a person to perform welding or soldering operations on thin bodies of metal.

A further object of this invention is to provide a device to enable a person to fill with weld or solder material holes in bodies of metal.

Still another object of this invention is to provide a back-up device for welding or soldering operations which is easy to apply to the body of metal being welded or soldered, and which is easy to remove therefrom.

It is also an object of the invention to provide an easily replaceable back-up device for welding or soldering operations, such for example as welding shut a seam.

Another object of the invention is to provide a back-up device which is readily adjustable to various conditions of operation and to variously shaped bodies to be welded or soldered.

For a better understanding of the present invention, together with other and further objects thereof, reference is had to the following description taken in connection with the accompanying drawings, and its scope will be pointed out in the appended claims.

In accordance with a feature of the invention there is provided a back-up device for use in welding, brazing or soldering metal, especially thin sheet stock, comprising a back-up plate. Means are provided securing the back-up plate to magnet means, and the magnet means are adapted to detachably secure the back-up plate to the sheet stock.

In the single sheet of drawing Fig. 1 is an isometric view of one form of the invention.

Figure 1:
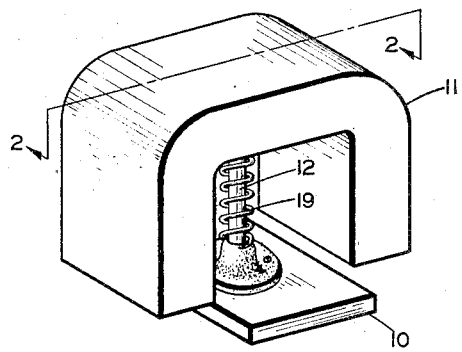

With reference to Fig. 1, the back-up device comprises a back-up plate 10 preferably made of non-magnetic material and magnet means 11. Securing means are provided for securing the back-up plate 10 to the magnet means 11. The securing means shown comprises a thin shaft 12 having a ball 13 at its lower end and having an enlarged head 14 at its other end. The enlarged head 14 is positioned in a hole 15 in the magnet means and a nut 16 is threaded into the hole 15. The shaft 12 is positioned in a hole extending through the nut 16, and the hole through the nut 16 is sufficiently small that it will not permit the enlarged head 14 to pass. It thereby secures the shaft 12 to the magnet means 11. A spring 19 is mounted co-axially around the shaft 12 with one of its ends pressed against the nut 16. The back-up plate 10 is replaceably connected to the ball 13 of the thin shaft 12, thereby compressing the spring slightly and holding it in place. The spring thus biases the back-up plate 10 away from the magnet 11.

When the magnet 11 is brought into engagement with a sheet of paramagnetic material 20 the magnetic forces set up between the sheet 20 and the magnet 11 serve to hold the two bodies together. The spring 19 is not sufficiently strong to resist the attraction of the magnet 11 for the metallic sheet 20 so it is further compressed. This causes the back-up plate 10 to be resiliently biased toward the sheet 20. The hole 15 in the magnet means 11 should be deep enough to accommodate the head end of the shaft 12 as the back-up plate is retracted until its outer face lies in the plane defined by the end faces of the magnet legs 21, 22.

The sheet 20 may have through it a hole 25 which is to be filled with solder or which is to be welded shut. The back-up plate 10 should be positioned directly behind the hole 25, thus serving to prevent the molten metal from falling through the hole 25 while the operator of the soldering or welding equipment seeks to close it. It is preferable to make the back-up plate 10 of a metal such as brass or copper to which solder and weld metals will not readily adhere so that the device can be easily removed after the hole is filled up, and its surface will remain flat so that it can be used over and over again. A metal back-up plate 10 also serves to conduct excess heat away from the welded spot. It may, in some applications, be desirable to use a back-up plate 10 which serves to localize and retain the heat. In such instance the back-up plate may be made of an insulating material.

In order that the back-up plate 10 will readily adjust itself to any small angle at which the body is to be soldered or welded may be inclined with respect to the ends of the magnet legs 21, 22, a ball and socket joint is provided between the shaft 12 and the back-up plate 10. A socket member 17 is secured to the back-up plate 10 by means of screws 18, and the ball 13 fits sufficiently loose in the socket that the back-up plate can pivot easily with respect to the shaft 12.

The aforedescribed device is very easily and quickly connected to any body of parametic metal, and is just as easily and quickly removed, thus forming a tool which is of value for production soldering or welding. The device may also be used for nonproduction soldering and welding as the ease with which it may be handled and its flexibility are of great importance. Where a back-up plate of some shape other than that shown in the drawing is to be used, the operator merely unscrews the plate 10 and screws another one on. Thus the shape of the back-up plate maye be quickly and easily changed to meet the varying requirements of the service to which the device is put.

Figure 2:
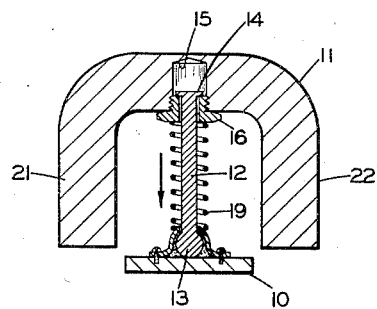
Fig. 2 is a cross-sectional view taken along line 2—2 of Fig. 1.
Figure 4:
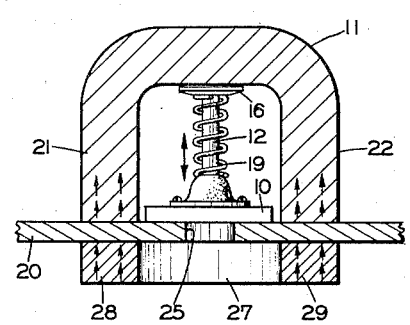
Fig. 4 is an end view of the device shown in Figs. 1 to 3 connected to a non-magnetic sheet of metal.
Figure 3:
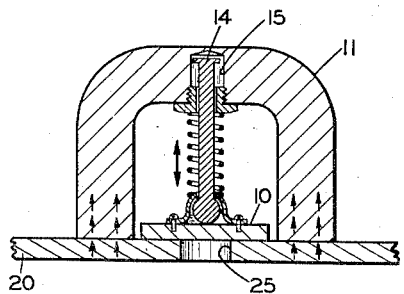
Fig. 3 is a cross-sectional view similar to Fig. 2, showing the device connected to a metallic body.

In the event that the sheet having a hole therein to be filled is made of a non-magnetic material, such for example as of aluminum, the back-up device is secured to it by utilizing an extra piece of magnetic material, as shown in Fig. 4. The construction of the back-up device is exactly the same as the construction shown in Figs. 1 to 3, but the sheet metal 20 is non-magnetic. A horseshoe-shaped piece of soft iron 27 is provided, and its legs 28, 29 are spaced apart the same distance as the legs 21, 22 of the magnet 11. The piece of soft iron 27 is applied to the side of the metal sheet 20' opposite the magnet 11 and the magnetic forces established through the sheet 20' are sufficient to hold both the magnet 11 and the soft iron piece 27 in place while the hole 25 is filled. By making the soft iron piece 27 horseshoe-shaped, it leaves the hole 25 free to be worked on.

Figure 5:
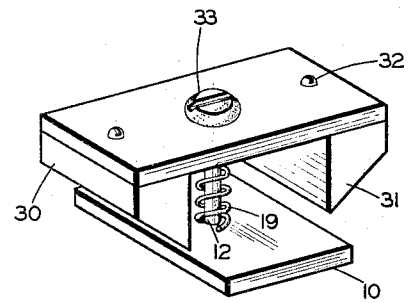
Fig. 5 is an isometric view showing a modified type of device.

While the magnet means shown in Figs. 1 through 4 have been shown shaped as a horseshoe, this is not essential. In Fig. 5 there is illustrated a back-up device comprised of a first bar magnet 30 and a second bar magnet 31, connected together by means of a bridge member 32. The bridge member 32 need not necessarily be made of magnetic material. The shaft 12 extends up through a hole in the bridge 32 and terminates in a head 33. The shaft 12 slides easily in the hole through the bridge 32, and the spring 19 is slightly compressed between the bridge member 32 and the back-up plate 10. As the device is connected to a piece of metal the shaft 12 slides up through the hole in the bridge 32.

It may often be desirable to use the back-up device on non-planar surfaces, and the ends of the magnet legs and the back-up plate may be made any shape for convenient usage. Thus, as is shown in Fig. 5, one or more of the ends of the magnet legs 30, 31 may be tapered to allow it to fit into a corner.

Figures 6, 7:
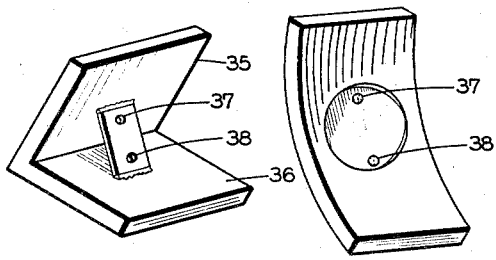
Figs. 6 and 7 illustrate by isometric views two back-up plates which may be used with the device of the invention.

For backing up seams in corners a back-up plate like the one shown in Fig. 6 may be used. If the angle in the corner is 90 degrees, two plates 35, 36 connected together at a 90 degree angle and having holes 37, 38 into which screws may be connected for securing the back-up plate to the magnet means, may be used. If the seam is in a curved body, a curved back-up plate like the one shown in Fig. 7 may be provided.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A small, unitary, self-contained back-up device for use in welding or soldering thin sheet stock comprising, horseshoe-shaped permanent magnet means having two spaced apart legs terminating substantially in a plane, a back-up plate, and connector means securing said back-up plate to said magnet means with said back-up plate located between said legs, said connector means including spring means normally biasing said back-up plate to a location beyond the ends of said legs.

2. A small, unitary, self-contained back-up device for use in welding or soldering thin sheet stock comprising, permanent magnet means having two spaced apart interconnected legs terminating substantially in a plane, a back-up plate of non-ferrous material, connector means secured to said plate means and secured to said magnet means for holding said plate means between said legs and including spring means normally biasing the back-up plate to a location beyond the ends of said legs and including self-aligning means whereby when said legs are magnetically secured against sheet stock the said back-up plate is retracted against the bias of said spring means.

3. A back-up device for use in welding or soldering thin sheet stock comprising, horseshoe shaped permanent magnet means having two spaced apart legs each terminating in a planar face, a shaft one end of which is slidably connected to said magnet means and which is positioned between said legs, back-up plate means connected to the other end of said shaft, and spring means biasing said shaft and said back-up plate away from said magnet means to a normal position beyond the plane defined by the ends of said legs.

4. A back-up device as claimed in claim 3, further characterized by said back-up plate means including a plate and self-aligning swivel means securing said plate to said shaft.

5. A back-up device as claimed in claim 3, further characterized by said spring means surrounding said shaft with one of its ends against said magnet means and the other of it sends against said back-up plate means.

HERBERT E. WHITE.

REFERENCES CITED

The following references are of record in the file of this patent:

UNITED STATES PATENTS

| Number | Name | Date |
| --- | --- | --- |
| 1,332,937 | Van Versen | Mar. 9, 1920 |
| 1,481,906 | Jackson | Jan. 29, 1924 |
| 1,901,634 | Dawkins | Mar. 14, 1933 |
| 1,902,051 | Wall | Mar. 21, 1933 |
| 2,254,314 | Reed | Sept. 2, 1941 |
| 2,256,634 | Webb | Sept. 23, 1941 |
| 2,289,458 | Rodgers | July 14, 1942 |
| 2,314,788 | Innes | Mar. 23, 1943 |
| 2,357,170 | Burggraf | Aug. 29, 1944 |
| 2,379,136 | Erwin | June 26, 1945 |
| 2,393,198 | Sommerville | Jan. 15, 1946 |